United States Patent
Snijder

(10) Patent No.: US 9,728,119 B2
(45) Date of Patent: Aug. 8, 2017

(54) FULLY ADDRESSABLE CUT-TO-MEASURE LED ARRAY

(75) Inventor: Pieter Jacob Snijder, Valkenswaard (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 542 days.

(21) Appl. No.: 13/322,974

(22) PCT Filed: May 28, 2010

(86) PCT No.: PCT/IB2010/052385
§ 371 (c)(1),
(2), (4) Date: Nov. 29, 2011

(87) PCT Pub. No.: WO2010/136998
PCT Pub. Date: Dec. 2, 2010

(65) Prior Publication Data
US 2012/0075271 A1    Mar. 29, 2012

(30) Foreign Application Priority Data
May 29, 2009   (EP) ..................................... 09161530

(51) Int. Cl.
*G09G 3/30*    (2006.01)
*G09G 3/32*    (2016.01)
(Continued)

(52) U.S. Cl.
CPC ............. *G09G 3/32* (2013.01); *G09G 3/2088* (2013.01); *G06F 3/1446* (2013.01);
(Continued)

(58) Field of Classification Search
CPC .................... G09G 3/30–3/32; G09G 2380/02
(Continued)

(56) References Cited

U.S. PATENT DOCUMENTS

| 6,784,458 B1 | 8/2004 | Wang et al. |
| 2007/0279424 A1* | 12/2007 | Keeney et al. ............... 345/531 |
| 2010/0109981 A1* | 5/2010 | Bhattacharya et al. ........ 345/55 |

FOREIGN PATENT DOCUMENTS

| WO | 2008033720 A1 | 3/2008 |
| WO | 2008044167 A2 | 4/2008 |
| WO | 2008120132 A1 | 10/2008 |

OTHER PUBLICATIONS

Stum et al., "A novel fault-tolerant architecture for self-organizing display and sensor arrays", pp. 1316-1319, Munich, Germany.
(Continued)

*Primary Examiner* — Hang Lin

(57) ABSTRACT

A cut-to-measure display device comprising a plurality of pixel groups (300) and a main controller. Each pixel group comprises one sub-controller (301) and a plurality of individually controllable pixels (305), out of which all are connected to the sub-controller of the pixel group and at least one is further connected (304) to a sub-controller of an adjacent pixel group. The main controller is connected to the sub-controllers and configured to selectively control the sub-controllers in order that the pixels display an image corresponding to predetermined image data. Cutting a display device with these features into an arbitrary geometric shape may disconnect some pixels from their respective sub-controllers. However, at least one pixel in each pixel group is connected to a further sub-controller which is operable to take the place of a sub-controller from which it has been cut off, so there is a low risk of completely disconnecting pixels.

2 Claims, 3 Drawing Sheets

(51) Int. Cl.
  *G09G 3/20* (2006.01)
  *G06F 3/14* (2006.01)
(52) U.S. Cl.
  CPC . *G09G 2300/0426* (2013.01); *G09G 2330/08* (2013.01); *G09G 2330/12* (2013.01); *G09G 2380/02* (2013.01)
(58) Field of Classification Search
  USPC ... 345/55, 90, 694, 204–206, 39, 44–46, 82, 345/83
  See application file for complete search history.

(56) References Cited

OTHER PUBLICATIONS

LED Ribbon Light, http://www.santaslites.com/ledribbon.html.

\* cited by examiner

FULLY ADDRESSABLE CUT-TO-MEASURE LED ARRAY

FIELD OF THE INVENTION

The invention disclosed herein relates to a cut-to-measure display device and a method for designing such device. In particular, the invention relates to an array of light-emitting diodes (LEDs) and associated control devices.

BACKGROUND OF THE INVENTION

Apart from its energy efficiency and low fabrication costs, LED technology offers a high degree of geometric adaptability when used in displays and light-emitting signs. Arrays of LEDs can be mounted on flexible substrates, such as a textile substrates. The array structure, which contains a plurality of small light-emitting bodies instead of larger incandescent or fluorescent light sources, provides an evenly distributed luminance. In order to achieve a comparable evenness using incandescent or fluorescent light sources, the display or sign must be given a considerable thickness.

LED technology has also been used for providing displays and signs of variable size and shape. One economically advantageous way of manufacturing such devices is to treat the LED array (when mounted on its substrate and possibly covered by diffuser layers and the like) as piece goods, furnished by the metre and capable of being cut to the desired size essentially without detriment to the function of the LEDs. Suitably, such arrays have distributed means for providing each LED with a driving current, either a separate unit for each LED or—more wiring-efficiently—one unit for every group of a fixed number of LEDs. The latter solution may not function properly if it is cut according to certain geometries, particularly geometries having an irregular contour or interior holes, as may be desired in connection with logotypes and the like.

FIG. 1 shows a cut-to-measure display in which each pixel 102 is controlled by a separate control means 101. The totality of the controllers are communicatively coupled to a main controller 105, which requires extensive horizontal and vertical wiring 104a, 104b. Clearly, each pixel inside the circular edge is connected to a control means. FIG. 2 shows an example of the other solution, wherein each control means 201 is connected to 16 pixels 202. Similarly to the device shown in FIG. 1, a main controller 205 controls the respective control means 201 via a plurality of connection leads 204. Near the circular edge are located a plurality of pixels 203, which are non-operable for lack of connection to their respective control means. This implies that the set of operable pixels will exhibit a different contour than the desired circular one; the resulting contour is substantially quadratic.

Co-pending application WO 2008/120132 discloses a cut-to-measure display device comprising LEDs organized in pixel groups. In the disclosed embodiments, each of the pixel groups comprises a controller connected to each LED in the group and adapted to provide it with a driving current. In WO 2008/120132, it is noted that the pixel groups may be provided with several controllers each, to make the display device more robust to cuts. This organization decreases the probability of pixels losing every connection to a controller, since this would correspond to all controllers in a pixel group being located on the same side of the edge (and outside the display device) after cutting.

SUMMARY OF THE INVENTION

It is an object of the present invention to overcome the problems known in related art and to provide a cut-to-measure display device in which the probability of pixels being rendered inoperable by the cutting is low and in which, yet, this is achieved at the cost of little hardware redundancy.

According to a first aspect of the present invention, these and other objects are achieved by a cut-to-measure display device comprising a plurality of pixel groups and a main controller. Each pixel group comprises one sub-controller and a plurality of individually controllable pixels, out of which all are connected to the sub-controller of the pixel group and at least one is further connected to a sub-controller of an adjacent pixel group. The main controller is connected to the sub-controllers and configured to selectively control the sub-controllers in order that the pixels display an image corresponding to predetermined image data.

Cutting a display device with the above features into an arbitrary geometric shape may disconnect some pixels from their respective sub-controllers. However, at least one pixel in each pixel group is connected to a further sub-controller which is operable to take the place of a sub-controller from which it has been cut off, so that there is a low risk of completely disconnecting pixels. With the exception of the totally disconnected pixels, every pixel in the display device after cutting is associated with a particular sub-controller responsible for driving it. The only hardware redundancy is the extra wiring provided to each of the doubly connected pixels. This extra wiring may nevertheless be in use even in pixel groups far from the edge—which are unaffected by a cut—as pixels may be reassigned along chains of successive pixel groups in order to distribute the available control capability more evenly.

In a preferable embodiment, each pixel group of the display device comprises at least one pixel connected to the sub-controller of a first adjacent pixel group and at least one pixel connected to the sub-controller of a second adjacent pixel group, different from the first one. This decreases the total length of the connection leads between sub-controllers and pixels. It also enables the provision of pixel reassignment chains, as mentioned above, along two different directions. Further pixels may be connected to sub-controllers of a third, fourth etc. adjacent pixel group.

Preferably, at least one pixel in each pixel group is only connected to the sub-controller of its own pixel group. The pixels located on top of the sub-controller or proximate thereto, which run a comparatively low risk of being cut off, may be exempt from being doubly connected. Since the extra connection leads to these pixels would be among the longest, this saves much wiring without making the device less reliable.

An example of a suitable light sources is LEDs. A pixel may comprise one LED or several. In particular, a pixel may consist of one red, one green and one blue LED, which makes a large color gamut available.

In an advantageous embodiment, each sub-controller comprises drivers, terminals and a programmable switch. Each driver is adapted to generate a driving current to a pixel and each terminal can be connected to one pixel. The number of terminals is greater than or equal to the number of drivers. By programming the switch, it is possible to establish a connection between a driver and a terminal, or a plurality of such connections. The programmability of the switch is the basis for the capability of reassigning pixels between sub-controllers. For instance, a default setting of the switch may be to connect each of the sub-controller's own pixels to a driver. If found necessary, the sub-controller may give up the driving responsibility of some pixels in order to take over the responsibility of other pixels, for instance, of pixels having been cut off from the sub-controller in their pixel group. If the sub-controller comprises as many drivers as terminals, the number of pixels taken over must not exceed the number of pixels handed over to another sub-controller. On average, the total number of sub-controllers will be sufficient to serve the pixels in any region cut out at random from the display device. If the region is positioned with due regard to the locations of the sub-controllers, then it is probably possible in most cases to avoid a shortage of drivers. On the other hand, if the sub-controller includes redundant drivers, then the region can be cut out with greater latitude. The redundant drivers may be as many as the connected pixels outside the pixel group, whereby reassignments of pixels will never be required. It is more hardware-economical to include a few redundant drivers in each sub-controller and allow reassigning of excess pixels near the edge.

The display device may be initialized after cutting by a process including each sub-controller checking its connection status. Advantageously, the connection status is determined by performing a resistance measurement (the current response to a predefined voltage excitation is monitored) at each terminal to see whether a device is connected or not. Suitably, each sub-controller has one terminal connected to each pixel in its pixel group and further terminals connecting pixels in the adjacent pixel group(s) that can be driven by the sub-controller in case of failure of their own sub-controller(s). By pixels being connected according to a predetermined pattern, the location of a pixel relative to its sub-controller can always be deduced from the identity of its terminal. Accordingly, provided the sub-controllers have known locations, the terminal connection status collected from all sub-controllers contains sufficient information for determining the set of available pixels in the display device after cutting.

The main controller may take an active part in the initiation of the display device after cutting. In an advantageous embodiment, the main controller is adapted to poll each sub-controller of its connection status and to operate the programmable switch of the sub-controller. If there are excess pixels in certain pixel groups and available driver capacity in others, then the main controller may perform load balancing through reassignment of pixels by causing switches of relevant sub-controllers to connect and disconnect pixels.

The display device is preferably arranged on a support layer which maintains the components in their relative positions and adds mechanical strength which protects the wiring. It is advantageous to use a flexible support layer, which is capable of assuming the same shape as a curved surface underneath. The device may also be arranged on a woven or knitted textile support layer, wherein some yarns are electrically conductive and may be used for supplying the connections between the main controller and the sub-controllers or between sub-controllers and pixels. Alternatively, a transparent hard plate (e.g., a glass plate) may serve as a suitable substrate, possibly in combination with low-temperature polycrystalline silicone electronics.

An image produced by an array of luminous pixels may give a jagged impression if the resolution is limited. This undesirable effect can be attenuated through the provision of a diffuser layer on top of the pixels. Such diffuser layer is adapted to widen each pixel into a larger spot, and adjacent spots may overlap to create soft transitions.

In accordance with a second aspect of the invention, there is provided a method of displaying an image using a cut-to-measure display according to the invention. The method includes:
processing the connection status and image information; and
based thereon, selectively transmitting control commands to the sub-controllers.

For a cut-to-measure display having not been used earlier for displaying an image, a different embodiment, which comprises additional initialization steps, may be applied. Such a method includes:
cutting the display along a contour;
connecting a main controller to the network formed by the interconnected sub-controllers; and
causing the sub-controllers to report their connection status.

The method may further include:
if possible, associating any pixel that is disconnected from the sub-controller in its own pixel group with a sub-controller in an adjacent pixel group;
if at least one disconnected pixel still exists, reassigning pixels between sub-controllers of consecutive pixel groups;
causing the sub-controller to report their connection status;
processing the connection status and image information; and
based thereon, selectively transmitting control commands to the sub-controllers.

Advantageously, each sub-controller is equipped with a non-volatile storage memory for storing the optimized sub-controller distribution and associated pixel connections. This removes the need for re-programming the sub-controllers and carrying out wiring optimization at every power up of the display device. In fact, it may be enough to carry out the optimization only once in the life cycle of a particular display device according to the invention. The resulting programming data can be downloaded to the sub-controllers and main controller as a manufacturing step. If a wiring problem or wiring damage occurs, then this can be easily repaired through reprogramming.

Finally, according to a third aspect of the invention, there is provided a process to be implemented by a software utility for designing a display device in accordance with the first aspect, namely a method of positioning a closed, two-dimensional contour relative to a lattice of pixels, sub-controllers and connections from pixels to sub-controllers. It is assumed each pixel is an endpoint of at least one connection. The method includes:
sampling a plurality of positions within one unit cell of the lattice;
for each sampled position, counting the number of sub-controllers contained inside the contour when positioned there; and
selecting a position having the greatest possible number of sub-controllers inside the contour.

More precisely, the number of sub-controller contained inside the contour is counted when a reference point on the curve is located at each of the sampled positions. The sampling may be performed deterministically—i.e., by going through a set of predetermined positions—or randomly. Because the pixels, sub-controllers and connections form a lattice when arranged in the display device (they exhibit a periodic geometry built up by copies of a unit cell), it is sufficient to look for an optimal position within the unit cell. Maximizing the number of sub-controllers inside the contour implies maximizing the number of drivers contained in the sub-controllers enclosed by the contour. This makes the occurrence of a global shortage of driving capability less probable and, thereby, increases the success probability of an attempt to reassign pixels in the interest of load balancing. The positioning method may also include finding an optimal relative orientation of the contour with respect to the lattice.

As the above method may provide multiple solutions for which the number of enclosed sub-controllers is maximal, further conditions can be imposed. Advantageously, the method is further adapted to minimize the number of totally disconnected pixels inside the contour, namely by:

counting, if the greatest possible number of sub-controllers inside the contour is achieved for more than one position, for each of these positions, the number of pixels inside the contour that have no connection not intersecting the contour; and from these positions, selecting the position which yields the least number of pixels inside the contour that have no connection not intersecting the contour.

It is noted that the invention relates to all possible combinations of features recited in the claims.

BRIEF DESCRIPTION OF THE DRAWINGS

These and other aspects of the present invention will now be described in more detail, with reference to the appended drawings showing embodiments of the invention. On the drawings.

DETAILED DESCRIPTION

Particular embodiments of the present invention will now be described. The invention may, however, be embodied in many different forms and should not be construed as being limited to the embodiments set forth herein; rather, these embodiments are provided by way of example so that this disclosure will be thorough and complete, and will fully convey the scope of the invention to those skilled in the art.

Figure 1:
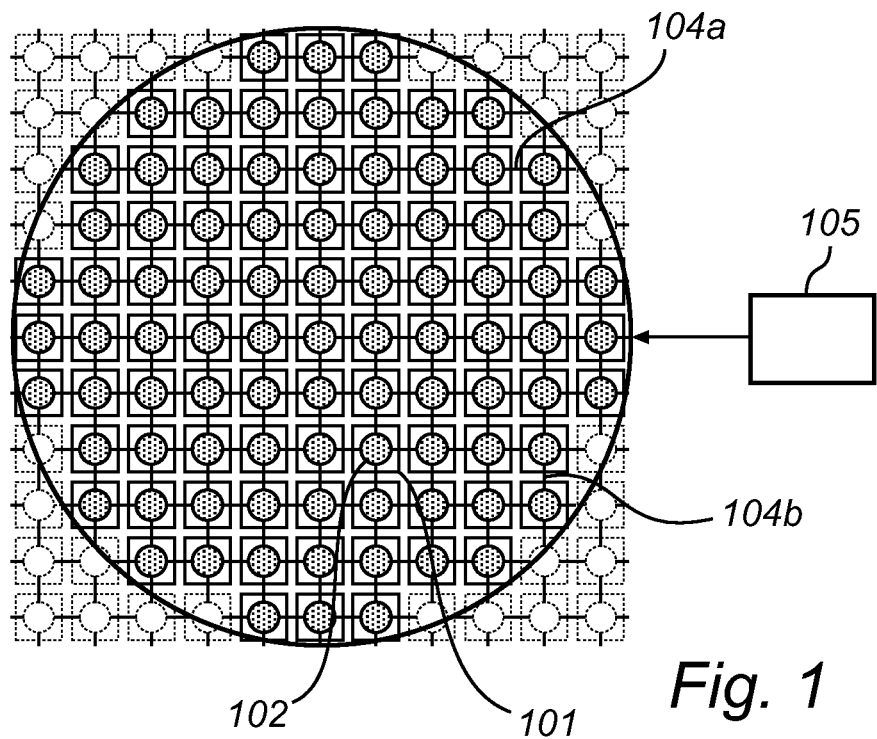
FIG. 1 shows a cut-to-measure display from related art, wherein each sub-controller controls one pixel.
Figure 2:
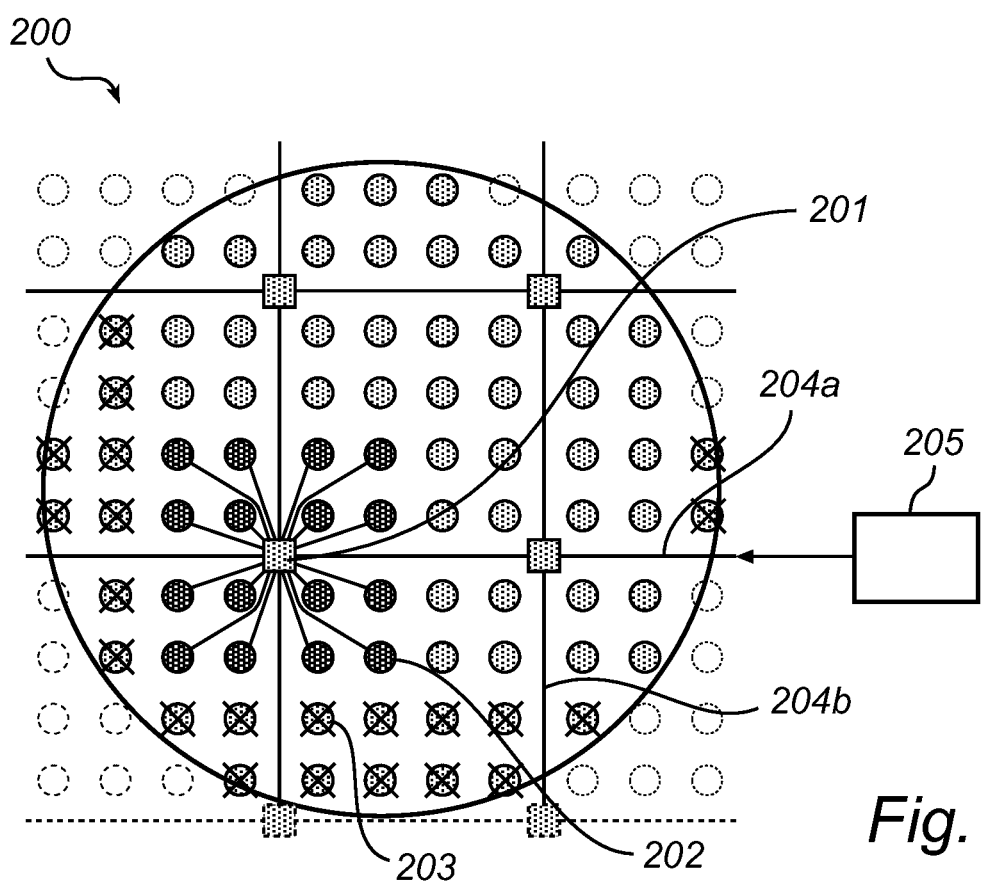
FIG. 2 shows another cut-to-measure display from related art, wherein each sub-controller controls a group of 16 pixels.
Figure 3:
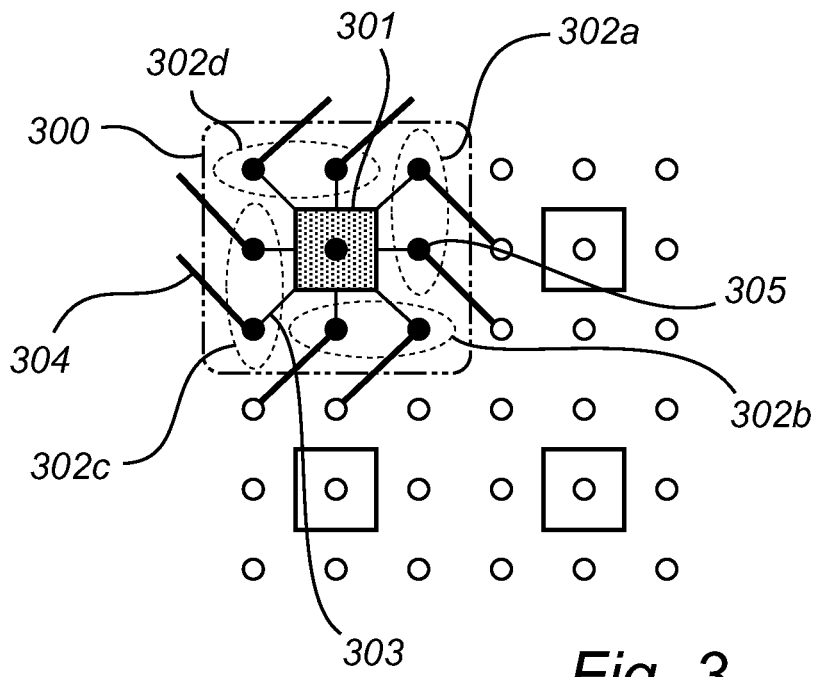
FIG. 3 shows four contiguous pixel groups of a cut-to-measure display according to an embodiment of the present invention.

FIG. 3 depicts four contiguous pixel groups, each comprising 3×3 pixels, of a cut-to-measure display device in accordance with a first embodiment of the invention. Typically, the display device comprises a total of tens, hundreds or thousands of pixel groups. In the upper left pixel group 300, a sub-controller 301, which is located beneath the centre pixel in the group and which is communicatively coupled to a main controller (not shown) of the display device, is adapted to control the nine proper pixels 305 of the pixel group. The connections 303 between the proper pixels 305 and the sub-controller 301 are indicated as thin solid lines, and the proper pixels 305 themselves are shown as filled circles. The sub-controller 301 is further adapted to control eight external pixels from four surrounding pixel groups connected to the sub-controller 301; pixels in the surrounding pixel groups are drawn as hollow circles. Four of the external pixels, located below and to the right of the pixel group 300, are visible in the figure. The outer portions 304 of the external connection leads 304 are drawn as thick solid lines; the inner portion of each external connection lead is electrically insulated from the connection lead of the proper pixel lying between the external pixel and the sub-controller, but has not been drawn separately. Conversely, the pixels in the subgroups 302a, 302b, 302c, 302d have connections (not shown) to adjacent pixel groups' sub-controllers, which are shown as squares.

In this embodiment, each pixel comprises three LED sub-pixels of different emission spectra, which enable the display device to produce color graphics. While variable intensity and a wide range of color points are generally desirable, LEDs (and many light sources suitable for use as pixels in a display device according to the invention) accept drive currents in a small intensity interval only. Therefore, the sub-controllers are adapted to provide a pulse-width modulated drive current to each LED. The drive current thus alternates between a high and a low level—such as the acceptable drive current of the LED and zero, respectively—wherein the percentage of high-level time is chosen in accordance with the desired power of each light source.

Because pixels in any of the subgroups 302 are each connected to two sub-controllers, they can be driven by either, as appropriate. For instance, if a pixel in the right subgroup 302a becomes disconnected by a cut separating it from its own sub-controller 301, then the sub-controller of the adjacent right pixel group can take over the responsibility of driving it. Similarly, a pixel in the lower subgroup 302b can be driven by the sub-controller of the adjacent lower pixel group. In this embodiment, the upper left pixel group contains no pixel that is connected to the lower right pixel group, and therefore cannot obtain assistance from the sub-controller of the lower right pixel group. The sub-controllers are powered through a power supply network (not shown) and receive control signals via a control network (not shown) linking them to the main controller (not shown). The control network is preferably non-hierarchical, so that the main controller can be connected at a location selected from a plurality of possible connection points after the display device has been cut to its desired geometric shape. In this case, the sub-controllers are uniquely broadcast addressable in such manner that the address indicates the location of the sub-controller; thus, the pixels connected to each sub-controller can be efficiently operated from the main controller.

Figure 4:
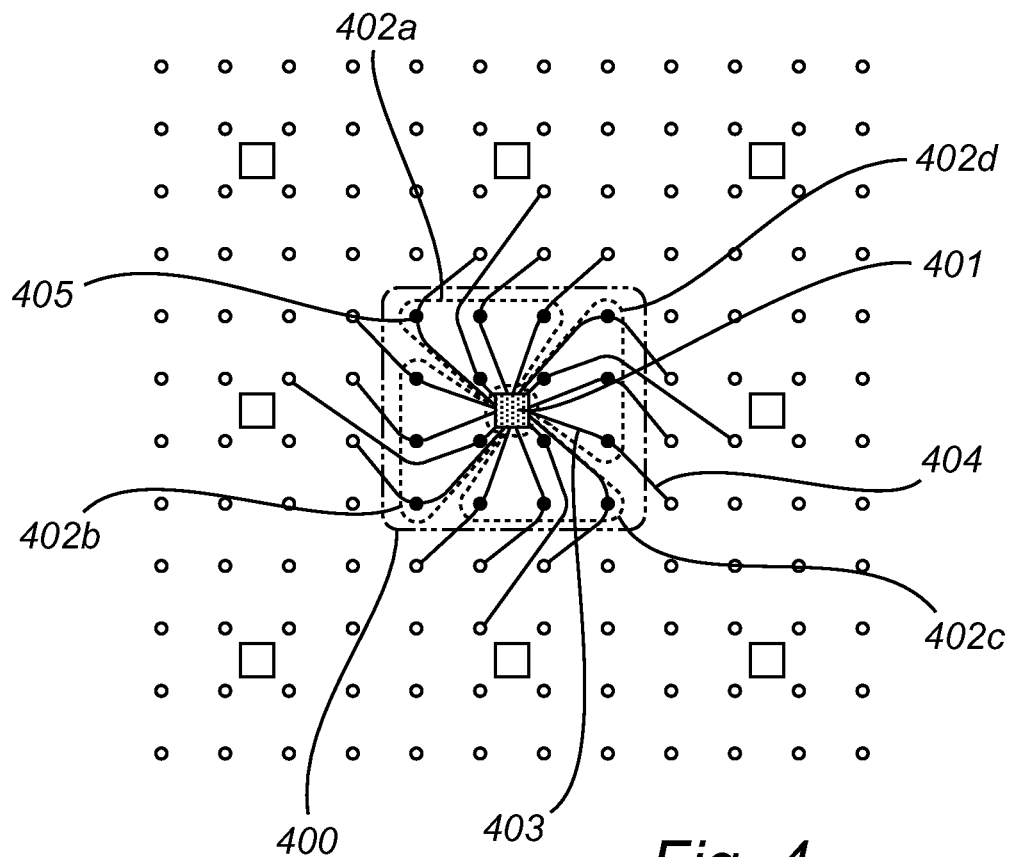
FIG. 4 shows three contiguous pixel groups of a cut-to-measure display according to another embodiment of the present invention.

FIG. 4 shows an embodiment in which each pixel group includes 4×4 pixels. Nine pixel groups are shown. The middle left pixel group 400 comprises a sub-controller 401 and sixteen proper pixels 405 shown as filled circles. With this geometry, each pixel 405 in the middle group 400 is doubly connected. For instance, the pixels in the right subgroup 402d are connected to both the sub-controller of their own pixel group (via connection leads 403) and to the adjacent right pixel group's sub-controller (via connection leads 404), by which they can be driven if disconnected from their own sub-controller. Similarly, the pixels in the other adjacent pixel groups can be taken over by the sub-controller 401 of the middle pixel group 400 if the location of the cut necessitates this.

Figure 5:
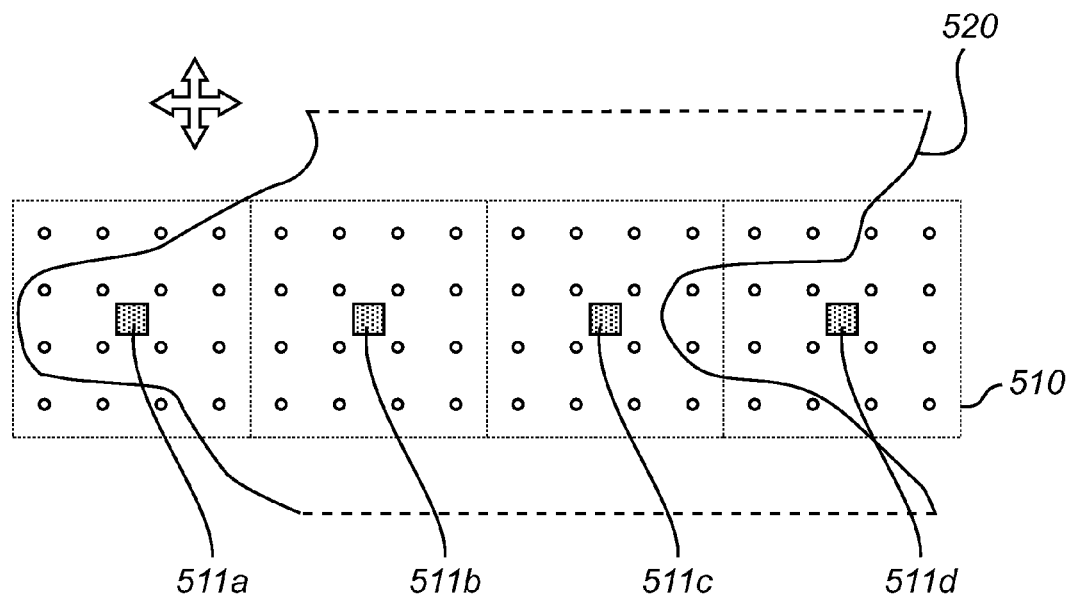
FIG. 5 is an illustration of the positioning method according to the present invention.

FIG. 5 illustrates a method of positioning the contour of a two-dimensional region 520 with respect to a lattice 510 of pixels (shown as hollow circles) and sub-controllers 511. The lattice 510, in which a pixel group is a unit cell, is organized according to the cut-to-measure display device of the invention, and the region 520 corresponds to a desired geometric shape of the display device. The lattice 510 extends horizontally and vertically beyond the four unit cells shown on the drawing. By virtue of the periodicity of the lattice, its position relative to the region 520 is determined by the position of a reference point on the region 520 with respect to a unit cell. For example, the leftmost corner of the region 520 may be used as the reference point, and all available relative positions can be assessed by moving the leftmost corner inside the left pixel group, the one which contains sub-controller 511a. In this embodiment of the method, positioning of the region 520 preserves a fixed orientation. Alternative embodiments may also obtain an optimal angle of the region 520 with respect to the lattice 510.

One way of finding the optimal relative position is to examine a set of points sampled from the unit cell by positioning the reference point of the region 520 in each of the positions and counting the number of sub-controllers contained inside the region 520 (i.e., contained inside the contour of the region 520). The greatest possible number of sub-controllers should be contained in the region 520 in its optimal position. To illustrate, considering only the sub-controllers 511 visible on the drawing, the position shown in FIG. 5 is preferable over the position obtained after a horizontal displacement of the region 520 to the right by 2½ pixel units, for the contour of the region then would not enclose the left sub-controller 511a.

As already noted, the maximization of the number of sub-controllers in the cut-to-measure display provides the best possible conditions for providing a sufficient number of sub-controllers to serve all pixels. If the sub-controllers are adapted to reassign driver capacity between each other, then the risk of a capacity shortage should be limited, at least for display devices above a certain size. On the other hand, very small display devices, comprising only a few pixel groups, will have poor resolution and will thus be less interesting already for this reason.

A main controller may be in charge of the initial configuration after cutting and, possibly, of coordinating reassignments of pixels from pixel groups containing excess pixels to pixel groups with available capacity. These processes may include sending information to (e.g., connection status of the sub-controllers) and from the main controller (e.g., commands for operating a switch for connecting terminals and drivers in a sub-controller) over the control network. As an alternative, the sub-controllers may also effect a self-configuration procedure including each sub-controller checking its initial connection status. Further sub-controllers with excess pixels may be adapted to direct a reassignment request towards adjacent pixel groups, which may in turn accept or deny the request after consulting its neighbors. Although many such requests may prove unsuccessful, this way of non-coordinated configuration may sometimes turn out to use available computational capacity more efficiently—recall that the sub-controllers are idle during initialization of the display device—than a similar procedure in which the main controller makes the decisions in a centralized manner.

Figure 6:
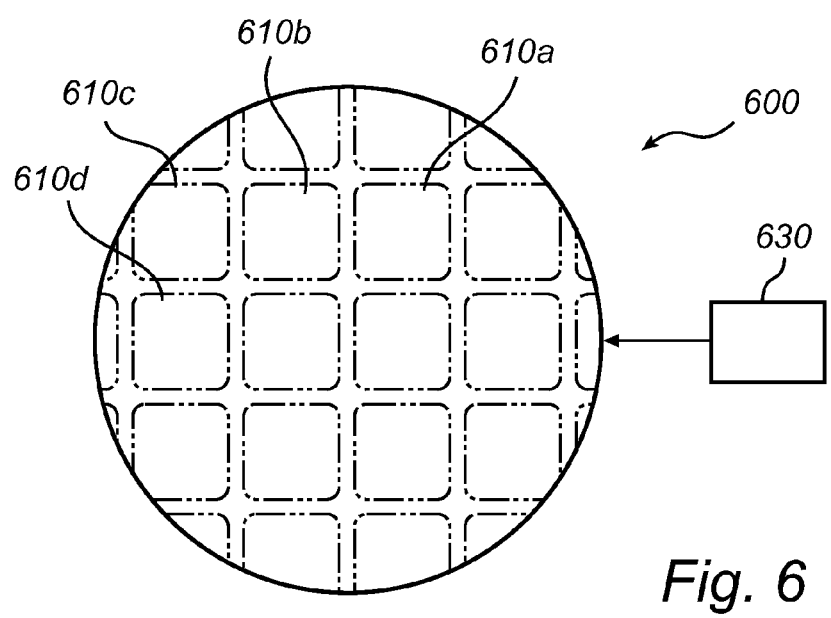
FIG. 6 shows a cut-to-measure display in accordance with an embodiment of the present invention.

FIG. 6 shows a cut-to-measure display device 600 with circular shape. The device is covered with juxtaposed pixel groups 610, each of which comprises a plurality of pixels, a sub-controller and connections between these. In each pixel group, in accordance with the invention, at least one pixel is further connected to the sub-controller of a first adjacent pixel group, and at least one other pixel is further connected to the sub-controller of a second adjacent pixel group. All sub-controllers are communicatively connected to a main controller 630 adapted to transmit control commands to them.

While the invention has been illustrated and described in detail in the drawings and foregoing description, such illustration and description are to be considered illustrative or exemplary and not restrictive; the invention is not limited to the disclosed embodiments. For example, it is possible to practice the invention in embodiments wherein the pixel group arrangements are quadratic but differently sized than disclosed (such as 2×2 or 5×5), rectangular or hexagonal. A choice of very small or very large pixel groups may, however, necessitate extensive wiring.

Other variations to the disclosed embodiments can be understood and effected by those skilled in the art in practicing the claimed invention, from a study of the drawings, the disclosure, and the appended claims. In the claims, the word 'comprising' does not exclude other elements or steps, and the indefinite article 'a' or 'an' does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method of positioning a closed two-dimensional contour relative to a two-dimensional lattice of pixels, sub-controllers and connections from pixels to sub-controllers, each pixel being an endpoint of the one or more connections, the method comprising:

sampling a plurality of positions within one unit cell of the lattice; counting, for each sampled position, a number of the sub-controllers contained inside the contour when positioned there; and selecting a position having the greatest possible number of the sub-controllers inside the contour.

2. A method according to claim 1, further comprising:

counting, when the greatest possible number of the sub-controllers inside the contour is achieved for more than one position, for each of these positions, a number of the pixels inside the contour that have no connection not intersecting the contour; and selecting, from these positions, a position which yields the least number of the pixels inside the contour that have no connection not intersecting the contour.

* * * * *